United States Patent [19]

Eumurian et al.

[11] Patent Number: 4,479,266
[45] Date of Patent: Oct. 23, 1984

[54] MULTIPLE-THRESHOLD OPTICAL RECEIVER FOR A VARIABLE-RATE DIGITAL DATA TRANSMISSION SYSTEM

[75] Inventors: Grégoire Eumurian; Robert Gadrault, both of Paris, France

[73] Assignee: Thomson-CSF, Paris, France

[21] Appl. No.: 406,936

[22] Filed: Aug. 10, 1982

[30] Foreign Application Priority Data

Aug. 12, 1981 [FR] France ............... 81 15599

[51] Int. Cl.³ .............................................. H04B 9/00
[52] U.S. Cl. ................................. 455/608; 455/619; 375/76; 307/358
[58] Field of Search ............. 455/601, 608, 619; 375/76, 17, 20; 307/464, 466, 356, 358

[56] References Cited

U.S. PATENT DOCUMENTS

| | | | |
|---|---|---|---|
| 3,324,455 | 6/1967 | Mayer | 307/464 |
| 3,509,279 | 4/1970 | Martin et al. | |
| 3,898,747 | 8/1975 | Marshall | 35/25 |
| 4,010,476 | 3/1977 | Elliott | 346/1 |
| 4,027,152 | 5/1977 | Brown et al. | 250/199 |
| 4,157,509 | 6/1979 | Zielinski | 328/147 |
| 4,229,831 | 10/1980 | Lacher | 455/619 |
| 4,229,831 | 10/1980 | Lacher | |

FOREIGN PATENT DOCUMENTS 2333387 6/1977
WO80/02092 10/1980 PCT Int'l. Appl.

OTHER PUBLICATIONS

E. C. Thiede "Decision Hysteresis Reduce Digital $P_e$," (IEEE Transactions on Communications, Oct. 1972).

Primary Examiner—Joseph A. Orsino, Jr.
Assistant Examiner—Timothy K. Greer
Attorney, Agent, or Firm—Oblon, Fisher, Spivak, McClelland & Maier

[57] ABSTRACT

An optical receiver designed for operation in alternating-current transmission over a broad temperature range and having a very large dynamic range comprises a capacitor between the transimpedance circuit and two comparator circuits for processing a signal which is coded at three levels. The amplifier can be of a type having a wide band but excluding the direct-current component. A threshold-generating circuit permits automatic connection of the thresholds to one of a plurality of discrete values which are predetermined as a function of the variation in amplitude of the signal. The optical link transmitter delivers the coded information in accordance with a code having a constant direct-current component such as a PBP code, for example.

9 Claims, 4 Drawing Figures

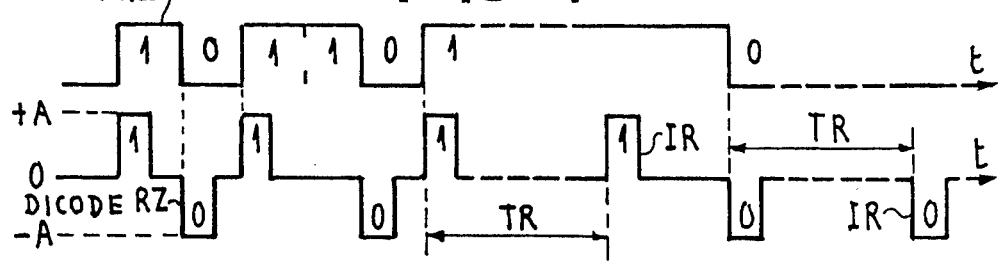
FIG_1
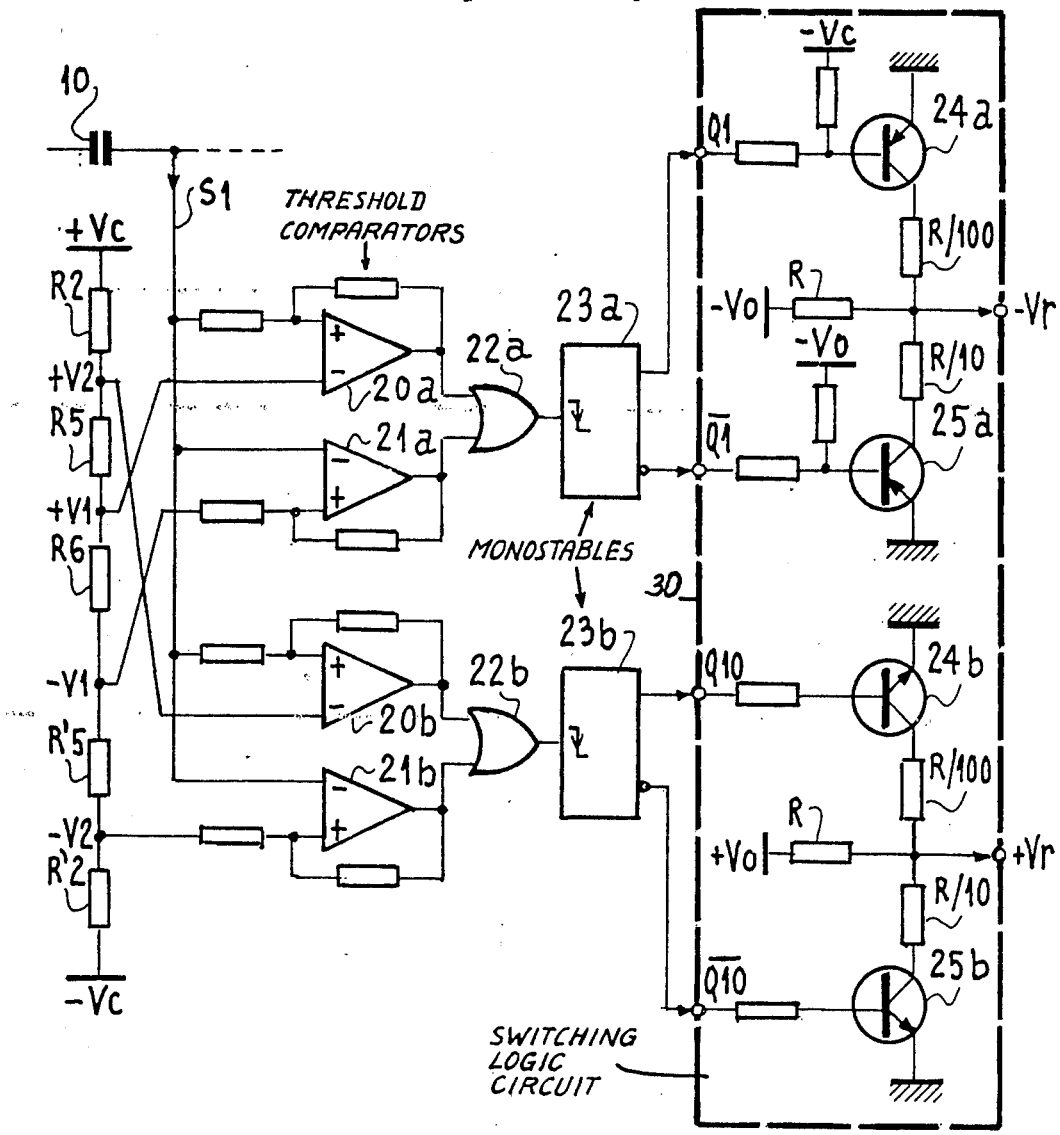
FIG_4

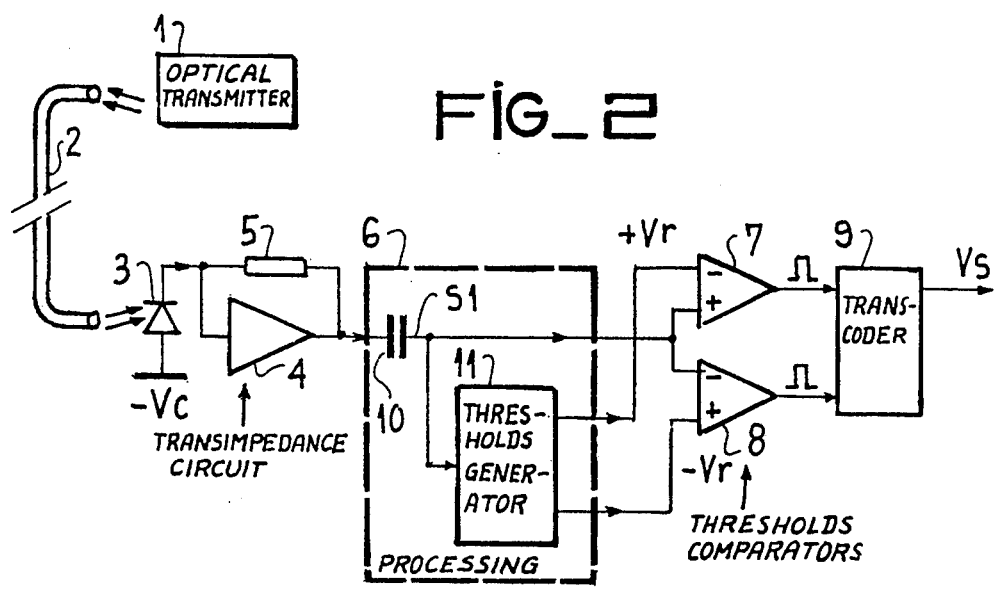
FIG_2
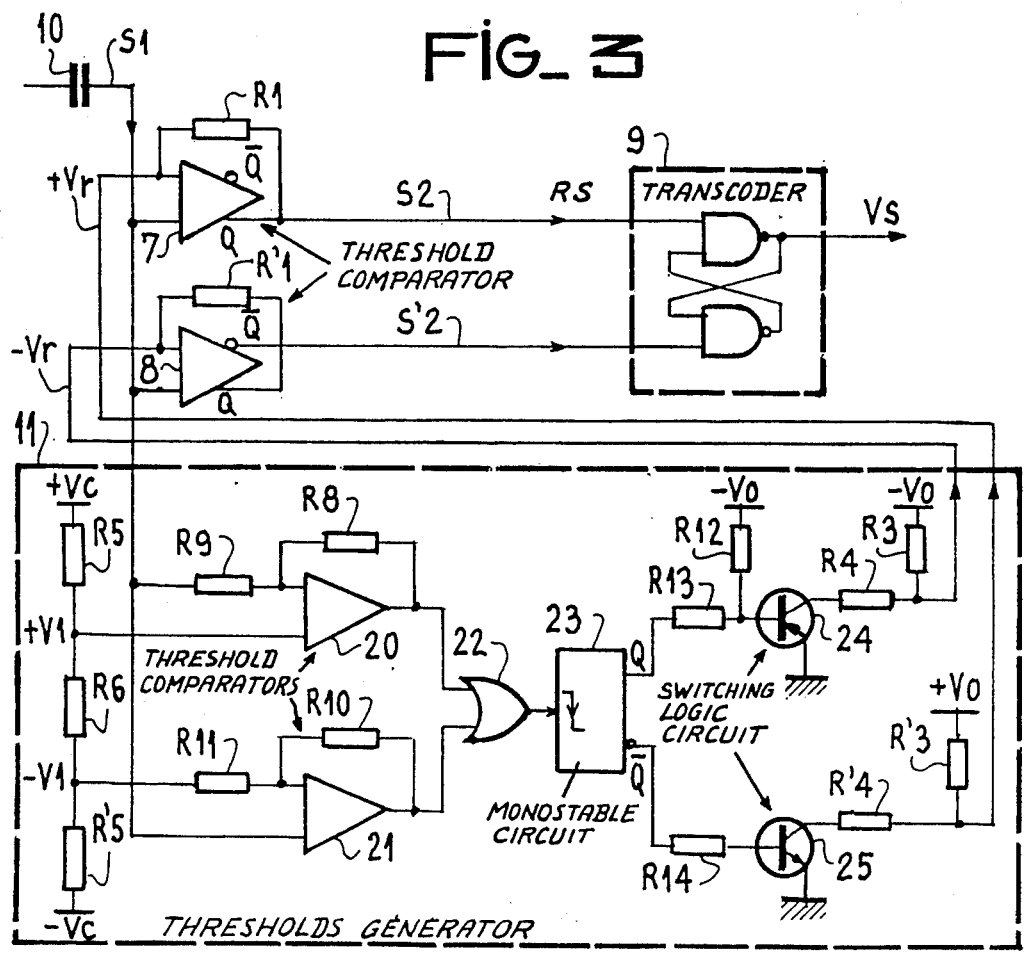
FIG_3

MULTIPLE-THRESHOLD OPTICAL RECEIVER FOR A VARIABLE-RATE DIGITAL DATA TRANSMISSION SYSTEM

This invention relates to a multiple-threshold optical receiver for equipping a variable-rate digital data transmission system.

The combined use of optical fibers, high-speed optical transmitters and optical receivers makes it possible to obtain wide-band communication links ranging from a few tens of megahertz to more than one gigahertz.

In comparison with electrical transmission systems, optical communication links offer the advantage of electrical insulation and a wide passband but are subject to the disadvantage of a transfer function which is liable to vary to an appreciable extent during utilization, particularly in a severe environment. Optical connectors are in fact extremely sensitive to mechanical tolerances and to dust particles.

Furthermore, optical fibers modify their transfer function under any action of nuclear radiations. This modification may be substantial and is liable to divide the initial optical power by factors ranging from ten to several hundreds. In addition to these variations caused by the fiber, modifications are also produced by the transmission and receiving elements. The transmission element can be a solid-state laser or an electroluminescent diode. In both cases (more particularly in the case of lasers), the optical power/current conversion slope which characterizes these elements varies as a function of temperature and of aging.

Optical reception can be carried out by means of two types of diodes, namely PIN diodes and avalanche diodes. PIN diodes are stable as a function of temperature and of bias voltage. Avalanche diodes have a light sensitivity which is about one hundred times greater but are also highly sensitive, however, to temperature and voltage variations.

When the system comprises a number of optical links, dispersion of the characteristics of each subassembly are added to the different causes of variations just mentioned. In order to include extreme configurations, provision must accordingly be made in a standardized system either for the association of a low-power transmitter and a fiber having a substantial length (or high attenuation) with a receiver having low sensitivity or for a high-power transmitter and a fiber having a short length (or low attenuation) with a receiver having high sensitivity.

The information in digital form to be transmitted through the optical fiber is obtained by making use of different methods of coding:amplitude modulation of the light power, frequency or phase modulation and digital or pulse-code modulation (PCM). In the case of amplitude modulation, it is essential to achieve accurate determination of the different losses in order to restore the correct level at the receiving end by modifying the gain. In the case of frequency modulation, phase modulation and digital modulation, it is necessary to restore the level in an approximate manner since the dynamic range of the processing systems, although limited, can nevertheless accept certain level variations.

Digital transmission systems exhibit in particular good tolerance for changes in the transfer function as well as noise level although this is achieved at the cost of a wider passband.

In comparison with conventional electrical transmission systems, optical digital-data transmission systems have the advantage of a wider passband (which can attain several hundred megabits/s over a distance of several kilometers) and insensitivity to electromagnetic parasites. However, insensitivity to changes in the transfer function must be much greater (in the case of electrical transmission, the transmitter, the cable and the receiver have very low sensitivity to temperature-dependent variations, aging, and so on). Taking into account the difficulty involved in transmitting frequencies up to the direct-current component level, it is necessary to make use of codes which do not have any components towards the lower end of the spectrum. This limitation of optical links in the low-frequency region is essentially caused by the dark current of the photodiodes (of the PIN type or of the avalanche type), the value of which is doubled at intervals of approximately 8° C. and rapidly becomes higher than the signal, especially in the case of high-attenuation links. By way of example, a PIN photodiode receiver having a dark current of 5 nA at 25° C. produces at 105° C. a dark current of the order of 5 $\mu$A, that is, having a value which is one thousand times greater.

Postulating a signal current at least equal to three times the dark current for the achievement of correct operation as well as an optical power/current conversion slope of 0.5 $\mu$A/$\mu$W, the sensitivity of the receiver is limited to 30 microwatts whereas removal of the direct-current component would permit a sensitivity considerably below one microwatt, subject to the need for sufficient amplification.

The difficulty involved in the construction of a wideband amplifier which passes the direct-current component is added to the difficulty just mentioned. For these different reasons, it is necessary to employ a transmission code having a zero or constant direct-current component.

Taking into account the diversity of codes employed at the present time, a link which would be incapable of transmitting a specific code would consequently be of limited use. On the other hand, a universal transmission system makes it possible to transmit all codes of any form, this being achieved by means of a first method of transcoding (external user code, internal code) which precedes the optical transmitter and a second method of transcoding (internal code, external user code) which follows the optical transmitter. The time-duration of each bit can thus be comprised between a minimum value (which is a function of the passband of the system) and a very high value. The transmission system thus operates as a transparent system or as a system providing a variable data rate within the range of 0 to a maximum rate of 0 to 10 Mbits/s, for example.

Aside from the possibility of accepting any external code, the use of the internal code offers an advantage in that it permits optimization of this internal code as a function of the specific properties of an optical transmission system without taking into account the constraints imposed by the external code, or user code.

The internal code in the transmitter-receiver link must arrive at a compromise between the frequency which is necessary for transmission of the code and ease of coding and decoding. Codes of the type known as NRZ (nonreturn-to-zero) are to be excluded in spite of their minimum band occupation by reason of the need to transmit a direct-current level. Codes of the so-called biphase type have a constant direct-current component but entail the need, at the level of the two transcodings, for clock signals having a repetition rate which is a multiple of that of the external code.

The code adopted is a three-level code having a constant mean value. A code of this type is known as a Pulse-Bi-Polar code (PBP code) and can be compared with a differentiation of the input code. Thus only the transitions are coded (as shown in FIG. 1). A positive pulse corresponds to a 0-1 transition and a negative pulse corresponds to a 1-0 transition (or conversely). The amplitude and time-duration of each of these pulses are identical. Preferably, the pulse duration is chosen so as to be substantially equal to one-half the shortest time interval (maximum repetition rate) of the external code. As can be observed, this code has a constant mean value. Said code readily accepts bit time intervals up to infinity. However, in order to guard against parasities, if the time-duration of one "1" bit or one "0" bit of the external code exceeds a predetermined value TR (which can be chosen so as to be equal to several hundred times the minimum bit time-duration in order to maintain a substantially constant mean value), a refreshment pulse IR corresponding to the previous state is automatically produced. If the input code continues to remain in the same state, a refreshment pulse is thus automatically produced at each period TR. By way of indication, an internal code defined by a (positive or negative) pulse duration of 50 ns and a refreshment pulse repetition frequency TR of 50 μs accepts different external codes having a variable rate such as, for example, 0 to 10 Mbits/s in the NRZ code and 0 to 5 Mbits/s in the biphase code.

An optical receiver which makes use of a three-level code of this type is described in particular in Hewlett Packard Components Application Note 1000, published in U.S.A. in August 1978 and entitled "Digital Data Transmission with the HP Fiber Optic System".

In this known design, the optical signal delivered by the transmitter is coded in the pulse-bipolar code (PBP code) and directed along an optical fiber to the receiver. Said receiver is composed of an input photodiode connected to a transimpedance assembly in which an operational amplifier and a resistor are grouped together. The output of this assembly is processed in an automatic gain control circuit (designated as an AGC circuit) comprising a variable-gain amplifier controlled from its output via a low-pass filter. The gain therefore varies as a function of the direct-current component. The output of the AGC circuit is then transmitted to two fixed-threshold and symmetrical comparators in order to detect in one case the pulses 1 and in the other case the pulses 0 of the signal. A flip-flop RS then carries out transcoding in order to recover the information in NRZ (nonreturn-to-zero) binary form.

This circuit arrangement is attended by a number of disadvantages. In the first place, the reception chain up to the comparator must necessarily operate in direct-current transmission, thus entailing the need for operation within a limited temperature range by reason of the variation in dark current of the photodiode and also because of the difficulties involved in the construction of the amplifiers. Furthermore, a wide-band AGC amplifier often exhibits distortion as a function of the level of the input signal (deformation of the signal and modification of its frequency response).

The general aim of the present invention is to provide a threshold-type optical receiver which overcomes these drawbacks. With a view to permitting operation over a broad temperature range and avoiding the use of an amplifier which passes the direct-current component, the optical receiver is entirely designed for alternating-current transmission. Furthermore, the AGC circuit amplifier which is difficult to construct is replaced by a circuit which causes the values of the thresholds of the comparators to vary as a function of the level of the received signal.

According to one object of the invention, the multiple-threshold optical receiver comprises a photodiode followed by a transimpedance assembly in which the amplification has a wide passband located outside the direct-current component level. The output of said amplifier is applied to the symmetrical comparators via a capacitive coupling. A circuit having the function of generating comparison thresholds and supplied from the output of the connecting capacitor makes it possible to vary the thresholds among a plurality of predetermined discrete values so as to cover a wide dynamic range of the signal.

These and other features of the invention will be more apparent to those skilled in the art upon consideration of the following description and accompanying drawings, wherein:

FIG. 1 illustrates signals representing the pulse-bipolar code (PBP code) obtained from binary NRZ information;

FIG. 2 is a general diagram of an optical receiver according to the present invention;

FIG. 3 is a partial diagram of one example of construction of an optical receiver according to FIG. 2;

FIG. 4 is a partial diagram showing a second example of construction of a receiver according to the invention.

Referring first to FIG. 2, the optical transmitter 1 of the variable-rate digital-data transmission system delivers the signal in optical form, said signal being coded in accordance with a code having a zero or constant direct-current component such as a pulse-bipolar or PBP code, for example. The light pulses are directed through the optical fiber 2 to the optical receiver.

As in the prior art recalled earlier, the receiver comprises an input photodetector stage 3 which can consist of a PIN photodiode or of an avalanche photodiode, said input stage being followed by a transimpedance circuit assembly comprising an amplifier 4 and a resistor 5. This assembly is followed by a processing circuit 6 which precedes the symmetrical-threshold comparators 7 and 8 and the RS transcoding flip-flop 9.

The differences with respect to the circuit arrangement of the prior art lie mainly at the level of the processing circuit 6 and accessorily at the level of the amplifier 4. Inasmuch as the receiver is designed for alternating-current transmission, the amplifier 4 is no longer necessarily an operational amplifier which passes the direct-current component but can consist of a wide-band reversing amplifier located outside the direct-current component level.

The processing circuit 6 comprises on the one hand a capacitor 10 which provides a connection between the output of the amplifier 4 and the comparators 7 and 8 and, on the other hand, a circuit 11 for generating comparison thresholds. The capacitor 10 eliminates the direct-current component and delivers the signal which appears in the form of positive and negative pulses having the same amplitude and time-duration. The level can vary as a function of the temperature and the state of the link. The output of the capacitor 10 is also applied to the threshold-generating circuit 11 in order to produce symmetrical threshold values as a function of the amplitude of the signal. A single pair of threshold values or reference values designated as +Vr in the case of the comparator 7 and as −Vr in the case of the comparator 8 in fact makes it possible to cover only a very limited range of variation of the signal, namely a range of about 1 to 10 times the threshold value; thereafter, the operation loses its reliability by reason of the presence of parasitic noise signals. In consequence, the circuit 11 acts as a decision element and makes it possible as a function of the amplitude variation of the signal to switch the threshold values so as to respond to a broad dynamic range. The variation in thresholds or reference values is non-continuous and takes place among a plurality of predetermined discrete values $\pm Vr1$, $\pm Vr2$, ... $\pm Vrn$, the number n of which is chosen in relation to the dynamic range to be covered.

FIG. 3 is a detailed representation of the receiver in the simple case in which a single switchover of reference values is contemplated. In FIG. 4, one embodiment of the decision assembly 11 corresponds to a possibility of double threshold switchover and it is apparent that the circuit 11 comprises a double number of channels whereas the rest of the receiver remains unchanged.

In FIG. 3, the receiver is shown after the capacitor 10. The resistors R1, R'1 which are associated with the comparators 7 and 8 provide a hysteresis level in conjunction with the resistors of the reference voltage sources ±Vr. Said hysteresis level is switched at the same time as the reference value, thus permitting of proportional operation at low and high levels. The RS transcoding flip-flop is constituted by two NAND gates connected in feedback loops. The threshold-generating circuit 11 comprises a channel formed of two threshold comparators 20 and 21 in which the positive and negative pulses designated as 1 and 0 of the signal S1 derived from the capacitor 10 are compared with symmetrical levels +V1 and −V1 respectively. The comparison outputs are applied via an OR gate 22 to a retriggerable monostable device. The output Q of the monostable device and its complementary output $\overline{Q}$ drive two switching circuits comprising transistors 24 and 25 in order to achieve switching of the reference levels between ±Vo and $$\pm V_o \frac{R4}{R3 + R4}.$$

By designating as Vm and VM the minimum and maximum amplitudes of the pulses at the output S1, the reception must therefore be capable of operating with a dynamic range D given by $20 \log_{10} VM/Vm$ dB (electrical). Assuming that this dynamic range is not too broad to be compatible with a single threshold switchover in the case of FIG. 3, the threshold must be placed in such a manner as to divide the dynamic range substantially by two. Thus the variable references ±Vr must have two values (at absolute value), where one value Vrm=kVm (with 0<k<1 in which k=0.8, for example) and where the other value Vrm located at ½D above is:

$$VrM = Vrm \sqrt{\frac{VM}{Vm}}.$$

By way of example, in the case of an input level which varies between ±10 mV and ±1 V or in other words in the case of a dynamic range of 40 dB, the two pairs of values ±8 mV and ±80 mV can be assigned to the variable references ±Vr. The threshold-generating circuit 11 must be capable of producing these two pairs of reference levels and of selecting them as a function of the input level. The estimation of the input level is made by the comparators 20 and 21, the symmetrical threshold ±V1 being obtained from supply voltages ±Vc and from the dividing bridge comprising resistors R5, R6 and R'5, (R5 and R'5 being equal). In order to prevent erratic operation, the absolute value /V1/ is chosen so as to be higher than the maximum value of the reference /VrM/. Thus, at the time of transition from Vrm to VrM, the pulses S1 have a sufficient level to overstep the thresholds of the comparators 7 and 8. In the case of the example under consideration, the value V1 can be located at 100 mV and switchover of the thresholds of the comparators 7 and 8 from 8 mV to 80 mV will take place while maintaining correct operation. Furthermore, in order to prevent accidental switching of the comparators 20 and 21 in the vicinity of the thresholds +V1 and −V1, these circuits are endowed with a hysteresis which is established by the resistors R8-R9 and R10-R11 respectively.

The outputs of the comparators 20 and 21 are connected via the logical OR gate 22 to the monostable device 23 which is retriggerable on the negative wavefront and has a time-duration which is slightly longer than the refreshment period TR. Said monostable device serves to store the information relating to change of state of the comparators 20 and 21. Automatic adjustment of the thresholds therefore follows the variations in levels of the optical link with a time constant which is slightly longer than the refreshment period TR. The time-duration adopted for the pulse of the monostable device is longer than the refreshment period in order to ensure continuous operation. The output of the retriggerable monostable device remains at the same level in the worst case in which the external code remains unchanged and the only pulses appearing on the line are the refreshment pulses. In the case of a period TR of 50 microseconds, the time-duration of the monostable device is approximately 60 microseconds, for example. The output and the complementary output of the monostable device drive the two symmetrical switching circuits which are provided around the transistors 24 and 25. By making a suitable choice of their values, the resistors R3 and R4 make it possible to switch both the value Vr of the reference voltage and the internal resistance of the circuit assembly.

The transistors 24 and 25 are designed for switching operation. The supplementary resistor R12 placed next to the transistor 24 is necessary for switching this latter, the control voltage of said transistor being positive and its collector voltage being negative. When the signal S1 reaches the levels +V1, the monostable device 23 is triggered and initiates turn-off of the transistors 24 and 25. The reference voltages are established at the level VrM equal to Vo by means of the direct-current supply voltages ±Vo at the end of the resistors R3 and R'3 which have the same value. The internal resistors have the value R3 and R'3 respectively and are equal.

Conversely, when the signal is located between ±V1, the output of the monostable device undergoes a reversal of state and the transistors 24 and 25 operate in the saturating mode, thus delivering the values $$\pm Vrm = \pm Vo \frac{R4}{R3 + R4}.$$

The resistors R4 and R'4 are of equal value and the internal resistances are given by $$\frac{R3 \times R4}{R3 + R4} = \frac{R'3 \times R'4}{R'3 + R'4}.$$

Taking into account the fact that the ratio between the two values VrM and Vrm is high and in fact much higher than 1, the resistance value of the resistor R4 (or R'4) is of a low order in comparison with the resistance of R3 (or R'3). Under these conditions, we may write by approximation:

$$\frac{VrM}{Vrm} = \frac{R3}{R4} = \frac{R \text{ maximum internal resistance}}{R \text{ minimum internal resistance}}$$

The hysteresis at the level of the comparators 7 and 8 depends on the fraction of the output voltage of the comparators returned to the input via the resistors R1 and R'1 (of equal value) and via the aforesaid internal resistance Rint. By designating the output voltage of the comparators (VS2=−VS'2) as VS2, the hysteresis voltage is equal to $$VS2 \times \frac{Rint}{Rint + R1},$$

that is, substantially $$VS2 \times \frac{Rint}{R1}$$

since R1 is so determined as to be much greater than Rint. This shows that the input hysteresis remains substantially constant. The ratio of the hysteresis values represented by the references Vrm and VrM verifies the relation:

$$\frac{Vhys \cdot m}{Vhys \cdot M} = \frac{Vrm}{VrM}$$

which shows that switching of the reference voltages takes place while the relative hysteresis is maintained substantially constant, with the result that similar operation is ensured at low and high levels.

The optical receiver which has just been described operates with an input dynamic range equal to 100. Should it be desired to extend this range even further, provision must accordingly be made for a greater number of reference levels, namely three or more instead of two levels. In this case, only the threshold-generating circuit 11 needs to be modified within the receiver.

The diagram of FIG. 4 applies to a reference having three distinct levels ±Vr1 (minimum value), ±Vr2 (intermediate value) and ±Vr3 (maximum value) in order to cover a dynamic range of the order of 60 dB, for example, the signal S1 being capable of varying between ±10 mV and ±10 V. The reference values are preferably determined so as to verify the relation Vr3/Vr2=Vr2/Vr1=p in order to ensure uniform distribution of the input dynamic range. Broadly speaking, we thus obtain:

$$\frac{Vr2}{Vr1} = \frac{Vr3}{Vr2} = \ldots = \frac{Vr(j+1)}{Vrj} = \ldots = \frac{Vrn}{Vr(n-1)}$$

in the case of an embodiment having n reference values.

In order to obtain three levels, the circuit arrangement of FIG. 3 is practically doubled with two channels comprising two pairs of comparators 20a, 21a and 20b, 21b, the OR-gate circuits 22a and 22b and the monostable devices 23a and 23b. The resistor bridge between ±Vc is so determined as to produce two values of levels ±V2 and ±V1 which are also in the ratio p. The switching circuit 30 downstream of the monostable devices is also doubled and consists of the transistors 24a, 24b and 25a, 25b and of resistors.

By way of example, in the case of a signal S1 within the range of ±10 mV to ±10 V, the references ±Vr can be ±8 mV, ±80 mV and ±0.8 V, the references ±V1 and ±V2 being placed at ±100 mV and ±1V respectively.

The table given below indicates the state of the outputs of the monostable devices 23a and 23b as a function of the level of the signal S1.

| VS1 | Q1 | Q10 |
|---|---|---|
| 0 to V1 | 0 | 0 |
| V1 to V2 | 1 | 0 |
| higher than V2 | 1 | 1 |

The resistor networks at the outputs of the switching circuit 30 have the respective values designated as R, R/10 and R/100 in order to produce the three desired pairs of values Vr by means of the supply voltages +Vo and −Vo. The impedances are thus proportional in the ratio p and make it possible to ensure operation with constant relative hysteresis at the level of the comparators 7 and 8. The table given below summarizes the three cases of operation:

| Q1 | Q10 | V (Reference) | R (internal) |
|---|---|---|---|
| 0 | 0 | VrM/100 | R/100 |
| 1 | 0 | VrM/10 | R/10 |
| 1 | 1 | VrM | R |

In the foregoing description, an optical receiver according to the invention is capable of equipping a digital-data optical transmission in which data transmission is carried out in accordance with a zero-component internal code at a rate which can vary between 0 and a maximum rate of 10 Mbits/s, for example. By virtue of its special arrangement, the optical receiver makes it possible to overcome the limitations of known assemblies and especially temperature limitations. The complexity of the receiver is localized within the threshold-generating circuit, the design concept of which is related to the extent of the dynamic range. It is worthy of note that, by means of the simple and preferred circuit arrangement comprising two comparison channels as shown in FIG. 3, a dynamic range of 40 dB can already be covered with great ease and corresponds to a ratio between the minimum signal and the maximum signal which varies within a range of 1 to 100.

It should also be pointed out that, in the case of a given dynamic range, if the number of threshold-switching operations is increased by increasing the number of channels of the threshold generator, the variation in threshold values will come close to that of the signal.

What is claimed is:

1. An optical receiver for equipping a variable-rate digital data transmission system of the optical type in which information is transmitted in the form of light pulses coded in accordance with a code having a constant direct-current component, said optical receiver being constituted by a photodetector stage in series with a transimpedance circuit whose output is applied via a capacitor of a processing circuit to a first set of two threshold comparators having symmetrical threshold values, the outputs of said comparators being applied to a transcoding circuit, said processing circuit comprising said capacitor to eliminate the direct-current component and a threshold-generating circuit receiving the output signal of the capacitor and for generating said symmetrical threshold values which are variable as a function of said output signal level, said values being selected in said threshold-generating circuit from a plurality of distinct discrete values which are predetermined so as to cover a large dynamic utilization range, said threshold-generating circuit including at least a second set of two threshold comparators to compare said output signal to symmetrical constant threshold values, and a decision logic circuit controlled by said second set of comparators to select the said variable threshold values.

2. An optical receiver according to claim 1 in which the transimpedance circuit is constituted by an amplifier and a resistor connected between the output of said amplifier and the input which receives the detected signal, said amplifier being a wide-band type which does not pass the direct-current component.

3. An optical receiver according to claim 1, wherein said first set of two threshold comparators are each equipped with a loop circuit composed of a resistor mounted between the output and the input which receives a reference threshold in order to produce a relative hysteresis with the internal resistance values of the threshold-generating circuit, said relative hysteresis being substantially constant irrespective of the switched threshold values.

4. An optical receiver according to any one of the preceding claims wherein, in order to produce a plurality of (n+1) distinct reference threshold values, the threshold-generating circuit is provided with n channels each of said channels comprising one pair of symmetrical comparators corresponding to said second set in order to compare the output signal of the capacitor with two fixed symmetrical levels, the comparison outputs being applied via an OR-gate circuit to a retriggerable monostable circuit which controls a switching logic circuit.

5. An optical receiver according to claim 4 for receiving information which is coded in accordance with a three-level internal code of the pulse-bipolar (PBP) type, wherein the stationary levels of comparison are so determined as to be higher than the upper value of the threshold selected by the channel considered, and the switching logic circuit comprises two resistor networks interposed between a direct-current supply and the reference ground potential each via a transistor designed for on/off operation and controlled by an output of the monostable circuit.

6. An optical receiver according to claim 5, wherein the threshold-generating circuit comprises a single channel for producing two distinct threshold values so as to cover a dynamic range of 40 dB (electrical) of the detected signal.

7. An optical receiver according to claim 5, wherein the threshold-generating circuit comprises two channels for producing three distinct threshold values for covering a dynamic range of 60 dB (electrical) of the detected signal.

8. An optical receiver according to any one of claims 1 to 3 and employed in a variable-rate digital data transmission system of the optical type, wherein the system is provided with an optical transmitter for producing the coded information in accordance with a three-level code of the pulse-bipolar (PBP) type and with a refreshment pulse emitted periodically when the coded signal remains unchanged during a predetermined period, the light pulses corresponding to the coding being directed along an optical-fiber conductor towards the photodiode of the receiver, the time-duration of the monostable circuit provided in each channel of the threshold-generating circuit being longer than the refreshment period.

9. An optical receiver according to claim 4 and employed in a variable-rate digital data transmission system of the optical type, wherein the system is provided with an optical transmitter for producing the information which is coded in accordance with a three-level code of the pulse-bipolar (PBP) type and with a refreshment pulse emitted periodically when the coded signal remains unchanged during a predetermined period, the light pulses corresponding to the coding being directed along an optical-fiber conductor towards the photodiode of the receiver, the time-duration of the monostable circuit provided in each channel of the threshold-generating circuit being longer than the refreshment period.

* * * * *